(12) United States Patent
Andersen et al.

(10) Patent No.: US 11,833,471 B2
(45) Date of Patent: Dec. 5, 2023

(54) CATALYSED FILTER SYSTEM FOR TREATING PARTICULATE-CONTAINING EXHAUST GAS FROM STATIONARY EMISSION SOURCES

(71) Applicant: JOHNSON MATTHEY PUBLIC LIMITED COMPANY, London (GB)

(72) Inventors: Paul Joseph Andersen, Audubon, PA (US); Thomas M. Yeh, Audubon, PA (US)

(*) Notice: Subject to any disclaimer, the term of this patent is extended or adjusted under 35 U.S.C. 154(b) by 470 days.

(21) Appl. No.: 16/830,338

(22) Filed: Mar. 26, 2020

(65) Prior Publication Data

US 2020/0306694 A1    Oct. 1, 2020

Related U.S. Application Data

(60) Provisional application No. 62/824,560, filed on Mar. 27, 2019.

(51) Int. Cl.
  *B01D 53/94* (2006.01)
  *B01D 46/24* (2006.01)
  (Continued)

(52) U.S. Cl.
  CPC ..... *B01D 53/9427* (2013.01); *B01D 46/2422* (2013.01); *B01D 53/56* (2013.01);
  (Continued)

(58) Field of Classification Search
  CPC ........... B01D 53/9427; B01D 46/2422; B01D 53/56; B01D 53/9418; B01D 46/64; B01D 2255/20723; B01D 2255/20761; F01N 13/017; F01N 2450/30; Y02C 20/00; Y02C 20/10
  (Continued)

(56) References Cited

U.S. PATENT DOCUMENTS

| | | | |
|---|---|---|---|
| 4,448,833 A | 5/1984 | Yamaguchi et al. | |
| 4,874,585 A | 10/1989 | Johnson et al. | |

(Continued)

FOREIGN PATENT DOCUMENTS

| | | |
|---|---|---|
| CN | 104128091 A | 11/2014 |
| CN | 106794411 A | 5/2017 |

(Continued)

OTHER PUBLICATIONS

Choi et al., "The Preparation of V2O5/TiO2 Catalyst Supported on the Ceramic Filter Candle for Selective Reduction of NO," Korean J. Chem. Eng., 18(4), 456-462 (2001).

(Continued)

*Primary Examiner* — Natasha E Young (57) ABSTRACT

A catalysed filter system for treating particulate-containing exhaust gas from a stationary emission source comprises an elongate filter element comprising porous walls which define a hollow section and a substrate material supporting a catalyst component disposed within the hollow section, the arrangement being such that gas entering the hollow section of the elongate filter element from across the porous walls thereof must contact the substrate material supporting the catalyst component before exiting the hollow section of the elongate filter element.

23 Claims, 5 Drawing Sheets

(51) Int. Cl.
*B01D 53/56* (2006.01)
*F01N 13/00* (2010.01)

(52) U.S. Cl.
CPC ........ *F01N 13/017* (2014.06); *B01D 53/9418* (2013.01); *F01N 2450/30* (2013.01)

(58) Field of Classification Search
USPC ........................................................ 422/177
See application file for complete search history.

(56) References Cited

U.S. PATENT DOCUMENTS

| | | | |
|---|---|---|---|
| 4,874,586 A * | 10/1989 | Szymanski | F23J 15/025 422/177 |
| 5,248,482 A * | 9/1993 | Bloom | F01N 3/0226 422/174 |
| 5,656,048 A * | 8/1997 | Smith | B01D 46/84 95/278 |
| 5,980,759 A * | 11/1999 | Proulx | B01D 29/58 210/493.4 |
| 6,602,308 B1 | 8/2003 | Carle et al. | |
| 6,863,868 B1 * | 3/2005 | Alvin | B01D 39/2068 422/177 |
| 7,879,758 B2 | 2/2011 | Heidenreich et al. | |
| 7,981,274 B2 | 7/2011 | Nacken et al. | |
| 8,388,898 B2 | 3/2013 | Heidenreich et al. | |
| 9,108,134 B2 | 8/2015 | Heidenreich et al. | |
| 2005/0095178 A1 | 5/2005 | Heidenreich | |
| 2009/0019770 A1 | 1/2009 | Nacken et al. | |
| 2010/0243554 A1 | 9/2010 | Herrin et al. | |
| 2012/0003131 A1 | 1/2012 | Ibrahim | |
| 2014/0271435 A1 | 9/2014 | Castellino et al. | |
| 2017/0144128 A1 | 5/2017 | Carrion et al. | |
| 2017/0320013 A1 | 11/2017 | Fernando | |
| 2017/0333819 A1 | 11/2017 | Carius et al. | |
| 2019/0118126 A1 | 4/2019 | Kollin et al. | |
| 2021/0101114 A1 | 4/2021 | Gabrielsson | |

FOREIGN PATENT DOCUMENTS

| | | | |
|---|---|---|---|
| CN | 109310950 A | 2/2019 | |
| DE | 2901448 A1 | 7/1979 | |
| DE | 3111532 A1 | 3/1982 | |
| DE | 3805361 A1 | 9/1988 | |
| DE | 19720981 A1 | 11/1998 | |
| EP | 0242488 A1 | 10/1987 | |
| EP | 0819459 A1 | 1/1998 | |
| EP | 1087113 A1 | 3/2001 | |
| EP | 1497011 B1 | 2/2008 | |
| GB | 2012612 A | 1/1979 | |
| GB | 2084897 A | 4/1982 | |
| JP | H04363116 A | 12/1992 | |
| TW | 534633 U | 1/2017 | |
| TW | 201902560 A * | 1/2019 | ......... B01D 39/2068 |
| TW | 201902560 A | 1/2019 | |
| WO | 9414522 A1 | 7/1994 | |
| WO | 98003249 A1 | 1/1998 | |
| WO | 9912642 | 3/1999 | |
| WO | 2003055577 A1 | 7/2003 | |
| WO | 03089114 A1 | 10/2003 | |
| WO | 2003089114 A1 | 10/2003 | |
| WO | 2009090447 A1 | 7/2009 | |
| WO | 2012003183 A1 | 1/2012 | |
| WO | 2016150465 A1 | 9/2016 | |
| WO | 2016150523 A1 | 9/2016 | |
| WO | 2018007307 A1 | 1/2018 | |

OTHER PUBLICATIONS

Nacken et al., "Catalytic activation of ceramic filter elements for combined particle separation, NOx removal and VOC total oxidation," Applied Catalysis B: Environmental 70 (2007) 370-376.

* cited by examiner

CATALYSED FILTER SYSTEM FOR TREATING PARTICULATE-CONTAINING EXHAUST GAS FROM STATIONARY EMISSION SOURCES

FIELD OF THE INVENTION

The present invention relates to a catalysed filter system for treating particulate-containing exhaust gas from stationary emission sources, such as from cement or glass manufacturing or coal-, biomass- or heavy fuel oil-power generation, which system comprising an elongate filter element comprising porous walls which define a hollow section. The elongate filter element can be a candle filter, for example

BACKGROUND TO THE INVENTION

Many processes exist wherein a hot gaseous medium is produced which contains particulate material that must be separated from the gaseous medium, either to prevent pollution, or to remove hazardous material. High temperature filtration of particulates has become an important component in many emerging technologies. For example, advanced coal conversion technologies, such as fluid bed gasification and combustion, are dependent upon the successful removal of particulates at temperatures in the range of about 500° C. to 1000° C. Other applications which benefit from high temperature filtration range from gas cleaning for biomass gasification to power generation from the incineration of municipal solid wastes. Waste gas from industrial processes such as municipal waste incinerators is filtered to remove particulate such as dust, soot and other toxic and noxious substances, thereby enabling the waste gases to be more safely released into the atmosphere. Further industrial processes involving combustion also generate particulates, like the production of minerals, glass or cement. These applications require the removal of particulates from gas streams at high temperature so that process equipment, such as rotating machinery and heat exchangers, which are subjected to the gas streams, remain functional and efficient.

Examples of hot gas filter assemblies are disclosed in U.S. Pat. No. 6,863,868. Hot gas filtration systems used in electric power generating systems protect downstream heat exchangers and gas turbine components from particle fouling and erosion and clean the process gas to meet emission requirements. When installed in either pressurized fluidized-bed combustion (PFBC), pressurized circulating fluidized-bed combustion (PCFBC), or integrated gasification combined cycle (IGCC) power plants, lower downstream component costs are projected, in addition to improved energy efficiency, lower maintenance, and elimination of additional and expensive fuel or flue gas treatment systems.

In many of these filtration applications, gaseous contaminants must also be removed from the exhaust. For example, during gasification, fuel-bound nitrogen in coal is principally released as ammonia ($NH_3$) into the fuel gas stream. With subsequent combustion of the fuel gas in a gas turbine, $NH_3$ forms oxides of nitrogen ($NO_x$), which are hazardous pollutants, difficult to remove and precursors to "acid rain". Particle-containing process off-gas and engine exhaust gas often contains a plurality of pollutants, e.g. NOx, volatile organic compounds (VOC), $SO_2$, CO, dioxins and furans, in concentrations that must be reduced depending on local legislation. For this purpose, several conventional methods are available. The abatement of gaseous contaminants like NOx, VOC, dioxins and furans can be effectively carried out by contact with a catalyst.

In order to treat $NO_x$ in exhaust systems comprising hot gas filters it is known to locate a selective catalytic reduction catalyst (SCR) in the system. Such catalysts catalyse the reduction of $NO_x$ selectively using a nitrogenous reductant, principally ammonia ($NH_3$) or an ammonia precursor such as urea, which reductant is injected into a flowing exhaust gas upstream from the SCR catalyst in an amount to promote the principal NOx reduction reactions of:

$$4NH_3 + 4NO + O_2 \rightarrow 4N_2 + 6H_2O; \tag{1}$$

$$4NH_3 + 2NO_2 + O_2 \rightarrow 3N_2 + 6H_2O; \text{ and} \tag{2}$$

$$NO + NO_2 + 2NH_3 \rightarrow 2N_2 + 3H_2O \text{ (the preferred so-called "fast SCR reaction").} \tag{3}$$

Depending on the exhaust gas composition, it may be necessary to include additional catalytic process steps in an exhaust gas aftertreatment process in addition or in the alternative to reducing oxides of nitrogen ($NO_x$). Such catalytic process steps can include oxidation, e.g. of hydrocarbons and/or carbon monoxide and/or residual ammonia not consumed in an upstream SCR catalyst.

The position of a SCR reactor in the process effluent strongly influences the decision as to what catalyst composition and physical structure should be used and such steps introduce complexity in the system, e.g. requiring additional catalyst volume to be located in the system. For example, in a high ash containing exhaust for a coal-fired power plant or boiler, a $V_2O_5/TiO_2$ extruded catalyst of low cell density (9 to 11 cells per square inch (cpsi)) operating at 350° C. to 400° C. and 3,000 to 5,000 l/hr space velocity or a $TiO_2$ catalyst bonded to parallel corrosion-resistant stainless-steel plate supports can be used. The SCR catalyst is located before any flue gas particulate or scrubbing operations, so it must have large channels or holes to avoid plugging and excessive back pressure (i.e., high pressure drop) build-up.

Catalyst deactivation occurs primarily by the accumulation of fly ash, containing alkali and alkaline earth metal oxides, and sulfur compounds on the surface or within the pore structure of the catalyst. Sulfates of the alkaline earth metals Ca, Mg, and Ba are frequently found blocking 50-65% of the pore volume depending on the specific bed location. With certain fuels, irreversible selective poisoning of the catalyst can occur. For example, arsenic (As) is a poison for $V_2O_5/WO_3/TiO_2$ SCR catalysts.

As a result of SCR catalyst loss through abrasion and poisoning, European experience with SCR in high-dust locations has been that about 15% of the system catalyst volume needs replacing annually.

Alternatively, SCR catalyst can be located downstream of an electrostatic precipitator (referred to as a "low-dust" configuration) or at a low temperature "tail-end" location in the system, wherein in both cases, catalysts in these environments are expected to have a lifetime of about 5 to 9 years. However, the finer dust particles that escape electrostatic precipitation of the "low-dust" configuration can deposit on the horizontally mounted catalyst bed resulting in pore plugging by alkali metal (K, Na, Cs) sulfates and alkaline earth metal sulfates; and energy intensive exhaust gas reheating may be required to promote the SCR reaction in the "tail-end" configuration.

Hollow, elongate porous filter elements closed at one end are known for use in filtering gas in exhaust systems. One such filter element is known as a "candle filter" and is typically made from various ceramic materials comprising ceramic fibres made of alkali and alkaline earth silicates, or aluminosilicates. Ceramic candle filters are used in many industries for removal of particulate matter from process gases. They are one of the most efficient types of dust collectors available and can achieve collection efficiencies of more than 99% for particulates. The relatively high particulate removal efficiency of ceramic candle filters is partly due to the dust cake formed on the surfaces of the candle filter and partly due to the candle filter composition and porosity.

Where the invention is for use at lower hot gas temperatures, e.g. about 250° C., the invention can be applied to so-called bag or fabric filters, which in use are disposed in a container called a "baghouse". The bag filters are long, cylindrical bags (or tubes) made of woven or felted fabric as a filter medium. Dust-laden gas or air enters the baghouse through hoppers and is directed into the baghouse compartment. The gas is drawn through the bags, either on the inside or the outside depending on cleaning method, and a layer of dust accumulates on the filter media surface until air can no longer move through it. When a sufficient pressure drop ($\Delta P$) occurs, the cleaning process begins. Cleaning can take place while the baghouse is online (filtering) or is offline (in isolation). The three most common types of cleaning method are mechanical shakers, reverse gas and pulse jet. When the compartment is clean, normal filtering resumes.

Yet another elongate porous filter element closed at one end is a sintered metal filter element, which typically have a porosity of about 50%.

For the avoidance of any doubt, whilst ceramic candle filters are used in the present specification to illustrate the invention, although candle filters are preferred, such illustration is non-limiting and the present invention is not restricted to candle filters as such. The filter elements of the present invention are defined in the claims as elongate filter elements comprising porous walls which define a hollow section.

Depending on the quantity of particulate in the exhaust gas to be treated, any system employing candle filters generally includes a procedure for regenerating the filters by shedding filtered particulate from the filter and then collecting and removing the shed particulate. One such process involves driving a reverse gas flow pulse across the filter medium when a sensed backpressure value is determined to have been reached.

It is known to combine elongate porous filter elements with specific catalysts for promoting conversion of gaseous contaminants, such as one or more of those mentioned above. For example, WO 98/03249 discloses a flue gas cleaning device, such as a ceramic candle filter, comprising a porous filter structure having a first and a second face where the pores of the porous structure form passages for flue gas between said first and second faces and jointly comprising a catalyst material for selective catalytic reduction of NOx in the presence of ammonia, where this catalyst material is applied on the surface of the passages. In order to improve removal efficiency of particulate matter in the filter, a membrane consisting of ultra-fine sintered ceramic powder, e.g. SiC, can be applied onto the filter element surface.

However, such combinations of filter and catalyst have a number of drawbacks. Firstly, caustic hot particulate-containing gases can cause the catalyst to be removed from a surface of the filter through use. Secondly, the application of a catalytic filter membrane increases the backpressure across the filter so that the filters require more frequent regeneration to maintain an acceptable backpressure or more complicated development is required to increase the porosity of the underlying filter substrate so that the catalytic filter membrane achieves the desired backpressure. However, increasing filter porosity also reduces the mechanical strength of the underlying filter. Thirdly, for catalyst disposed in the wall of the filter substrate, such arrangement can also reduce the mechanical strength of the filter. This is because catalytic activity is dependent on the quantity of catalyst present. Therefore, in order to achieve the same porosity but increase the catalyst loading, fewer strengthening fibres can be present. Moreover, certain catalyst systems such as $V_2O_5/TiO_2$ $NO_x$ reduction catalysts require that certain binders are used to be active, e.g. $TiO_2$.

Therefore, by incorporating a particular catalyst within the filter wall, the design options become more restricted, i.e. a particular binder is required for a desired catalyst activity which may result in a product that is not as mechanically strong as an alternative binder but that has no catalytic functionality.

SUMMARY OF THE INVENTION

We have now devised a catalysed filter system for use in an exhaust system of an industrial plant operating an industrial process that generates particulate-containing exhaust gas, wherein the exhaust gas also contains one or more components that require catalytic treatment. The catalysed filter system provides for more efficient filtration, a more flexible arrangement of catalyst steps, the possibility of retrofitting catalysts to existing filters and a more compact arrangement of filter and catalyst than prior art disclosures.

According to a first aspect, the invention provides a catalysed filter system for treating particulate-containing exhaust gas from a stationary emission source, which system comprising an elongate filter element comprising porous walls which define a hollow section and a substrate material supporting a catalyst component disposed within the hollow section, the arrangement being such that gas entering the hollow section of the elongate filter element from across the porous walls thereof must contact the substrate material supporting the catalyst component before exiting the hollow section of the elongate filter element.

In a second aspect, the invention provides a cartridge structure for retaining a substrate material supporting a catalyst component, which cartridge structure being insertable into a hollow section of an elongate filter element for treating particulate-containing exhaust gas from a stationary emission source, which cartridge structure comprising a central porous hollow section around which the substrate material is arranged.

In a third aspect, the invention provides a cartridge structure for holding a substrate material supporting a catalyst component, which cartridge structure being insertable into a hollow section of an elongate filter element for treating particulate-containing exhaust gas from a stationary emission source, which cartridge structure comprising a pleated planar self-supporting substrate material mounted at least at one end thereof on an annular disc-shaped base, wherein the self-supporting substrate material is one or more layers of knitted gauze, cotton gauze, wire mesh, glass fibre paper or quartz fibre paper.

In a fourth aspect, the invention provides an exhaust system for a plant for performing an industrial process, which system comprising an injector for a nitrogenous reductant or a precursor thereof, a source of nitrogenous reductant or a precursor thereof and a catalysed filter system according to any preceding claim, wherein the catalyst component is active for catalysing selective catalytic reduction of oxides of nitrogen with a nitrogenous reductant According to a fifth aspect, there is provided the use of a catalysed filter system according to the first aspect for treating hot particulate-containing exhaust gas from a coal, heavy fuel oil or biomass power generation plant.

According to a sixth aspect, there is provided the use of a catalysed filter system according to the first aspect for treating hot particulate-containing exhaust gas from industrial processes including municipal waste incineration, mineral, glass or cement manufacture.

According to a seventh aspect, there is provided a method of treating a hot particulate-containing exhaust gas containing oxides of nitrogen from a stationary emission source, which method comprising injecting a nitrogenous reductant into the exhaust gas, filtering particulate from the exhaust gas containing the nitrogenous reductant by passing the exhaust gas through porous walls of the catalysed filter system according to the first aspect and into the hollow section thereof; contacting substrate material supporting catalyst component active for catalysing selective catalytic reduction of oxides of nitrogen within the hollow section with particulate-filtered exhaust gas containing the nitrogenous reductant; and allowing exhaust gas which has contacted selective catalytic reduction catalyst to exit the elongate filter element.

DETAILED DESCRIPTION OF THE INVENTION

The present invention will now be further described. The following sections relate to different parts of the catalysed filter system of the invention and define each part in more detail. Each part or aspect of the catalysed filter system (e.g. the elongate filter element, the substrate material, the catalyst component, the cartridge structure etc.) may be combined with any other part or aspect of the catalysed filter system unless clearly indicated to the contrary. In particular, any feature indicated as being preferred or advantageous may be combined with any other feature or features indicated as being preferred or advantageous.

Applicant is not aware of any prior art disclosure for introducing catalyst capability into the hollow section of an elongate filter element comprising porous walls. The prior art discloses catalytic candle filters wherein catalyst has been introduced into the walls of the filter, either by impregnation of an inert filter body, by applying a surface coating to an outer surface of an inert filter body or by combining a catalyst composition with the composition of the filter body during manufacture so that the final product comprises a structure wherein the filter wall composition and the catalyst composition are indivisibly combined. Each of these arrangements results in some form of compromise in filter design and/or complication in manufacture.

Alternatively, the catalyst is placed in a location remote from the filter, e.g. in a high dust, low dust or tail-end location described in relation to coal-fired boiler applications hereinabove, requiring a dedicated catalyst housing. This results in an increase in size and complexity of the system as a whole. Furthermore, the location of the catalyst in the system may be dictated by the overall system design including the filter location, thus reducing design flexibility.

The claimed invention is advantageous in that a substrate material supporting a catalyst component which is insertable within the hollow section allows for flexibility in terms of installation of the catalyst function. This allows the catalysation of both new candle filter installations and retrofit of existing candle filter installations. Furthermore, catalyst functionalization of filter by means of an insertable component(s) such as a cartridge allows for multiple cartridges to be used concurrently, and this allows for different catalyst functions to be present in the same candle filter. A separate operational advantage is that if the catalyst support is properly chosen, the combination of the catalysed support material and candle filter has reduced back pressure compared to a candle with the catalyst directly coated onto the surface of the body of the candle. A lower back pressure allows for higher operating efficiency and thus lower operating cost.

Elongate Filter Element

According to a preferred embodiment, the elongate filter element of the catalysed filter system according to the first aspect is closed at one end thereof. An illustrative example of such preferred embodiment is a candle filter. Another illustrate example of such preferred embodiment is a bag filter as described hereinabove. However, preferably the elongate filter element is a candle filter.

Preferably, the hollow section is circular in cross-section. The hollow section of the preferred candle filter is generally circular in cross-section. Depending on the dimensions of an existing application, candle filters are typically made about 2-6 metres in length, have a circular cross section and a circular hollow cross-section having a diameter of about 40-120 mm and a wall thickness of 15-50 mm.

In use, inert, uncoated candle filters generally have a backpressure less than 124 Pa (equivalent to about one-half inch water) at a typical face velocity of 50 m/h. Catalysed candle filters having a backpressure increase relative to an inert, uncoated candle filter of 50% is acceptable, e.g. to 374 Pa.

Preferably, the elongate filter element is ceramic. Typically, a candle filter comprises ceramic oxide support fibres mixed with a ceramic filler material. The ceramic oxide support fibres can be silica-aluminate or calcium-silicates or bio-soluble calcium-magnesium silicates. Suitable fillers include alumina, silica, magnesia and mixtures thereof.

The elongate filter element can have a porosity of from about 70 to about 90%, i.e. for candle and bag filters, not sintered metal filters, and a wall thickness of from about 10 to about 40 mm Substrate Material The substrate material can comprise a ceramic foam, a bead, a microsphere, an extrudate, a pebble, a tablet, a pellet, a Raschig ring, a honeycomb monolith, a channelled honeycomb body, a knitted gauze, a cotton gauze, a wire mesh, an alumina fibre paper, a glass fibre paper or a quartz fibre paper.

Smaller substrate material items such as catalysed beads, microspheres, extrudates, pebbles, tablets, pellets and Raschig rings can be poured into the hollow section of the elongate filter element closed at the lower end thereof and retained within the hollow section under gravity. This is because, in use, the flow rate of gas through the candle filter is not so great that they are pushed out of the upper, open end of the filter element. However, a disadvantage of this arrangement is that the reverse gas flow pulse for removing particulate build up on the outer surface of the filter wall is at higher back pressure and so more energy is required to achieve an adequate pulse. These substrate materials can have higher backpressure in the normal flow direction of use. However, backpressure can be adjusted by selecting, e.g. larger beads, shapes of bead that do not sit closely together, e.g. spheres, so that larger gaps between the spheres can be maintained, channelled beads, or larger diameter Raschig rings etc.

However, preferably, the substrate material is selected for lower backpressure. Examples of such substrate materials include knitted gauze, cotton gauze, wire mesh, alumina fibre paper, glass fibre paper or quartz fibre paper. Quartz fibre paper is particularly preferred because it has a high resistance to chemicals, does not absorb NOx or sulfur dioxides and SOx to any significant extent and it is relatively unaffected by humidity. Paper including fibres having a higher silica content is preferred for treating effluent gases having relatively high sulfur content. Alumina fibre paper is preferred where there is a relatively lower sulfur content in the effluent gas, because the alumina can be catalytically active as such or the alumina fibres in the paper can support an active metal and the combination of active metal and alumina fibre is catalytically active.

Cartridge Structure

Certain substrate materials automatically lend themselves to use in a cartridge structure-type arrangement. These include honeycomb monoliths and channelled honeycomb bodies, provided that they are appropriately sized and dimensioned to fit into the hollow section.

However, preferably, a cartridge structure insertable into the hollow section of the elongate filter element, wherein the cartridge structure retains or holds the substrate material.

Preferably, the cartridge structure comprises a central porous hollow section around which the substrate material is arranged. Further preferably, the cartridge structure comprises a central porous hollow section around which the substrate material is arranged. The substrate material can comprise a ceramic foam, a bead, a microsphere, an extrudate, a pebble, a tablet, a pellet, a Raschig ring, a honeycomb monolith, a channelled honeycomb body, a knitted gauze, a cotton gauze, a wire mesh, an alumina fibre paper, a glass fibre paper or a quartz fibre paper.

In one embodiment, the substrate material is a self-supporting catalysed ceramic support.

Figure 1:
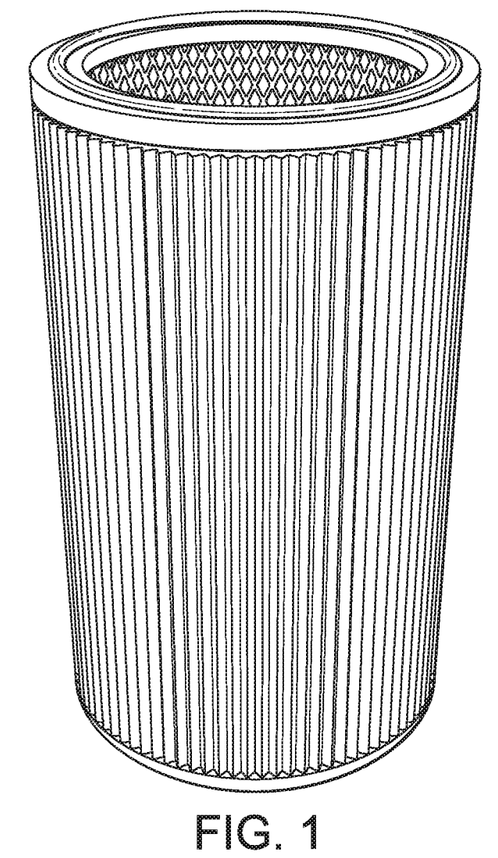
FIG. 1 shows a pleated air filter cassette, which arrangement may be adapted for use in the present invention, wherein the pleated filter paper is replaced, e.g. with a catalysed pleated glass fibre mat.
Figure 2:
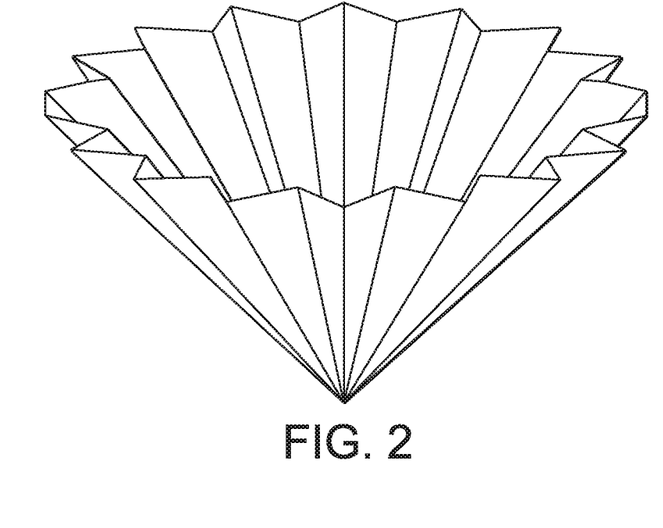
FIG. 2 shows a pleated filter paper disc used in laboratory scale research. A similarly pleated, e.g. glass fibre, catalysed paper disc could be used as an insert in a hollow-section of e.g. a candle filter. The pleats increase the surface contact area and also provide self-supporting rigidity to the insert. An advantage of such an arrangement is that the lower or "pointed" end of the insert is already closed to avoid gas bypassing the catalyst.
Figure 3:
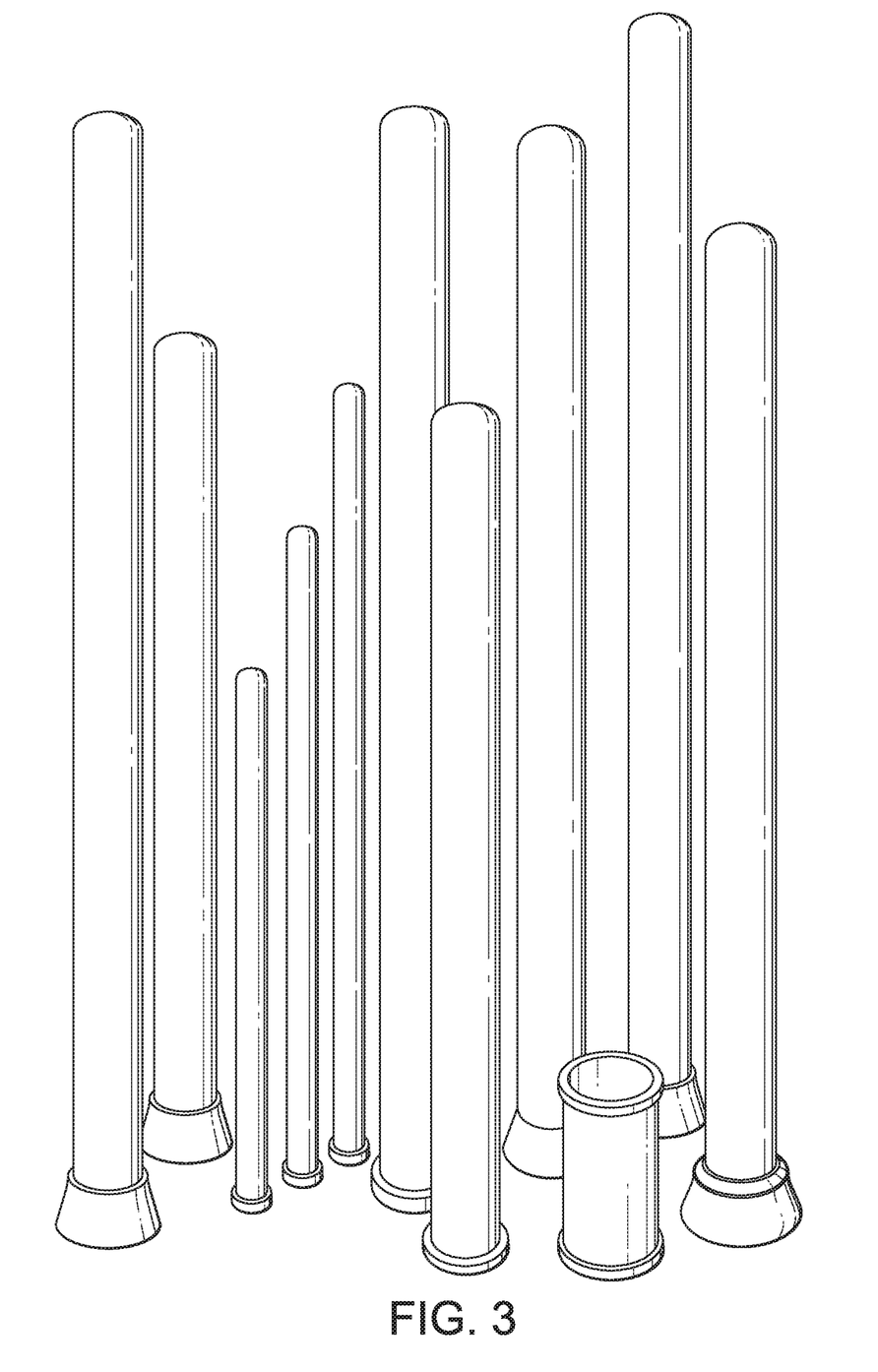
FIG. 3 shows an array of commercially available ceramic candle filters showing the variations in length and diameter available.
Figure 4:
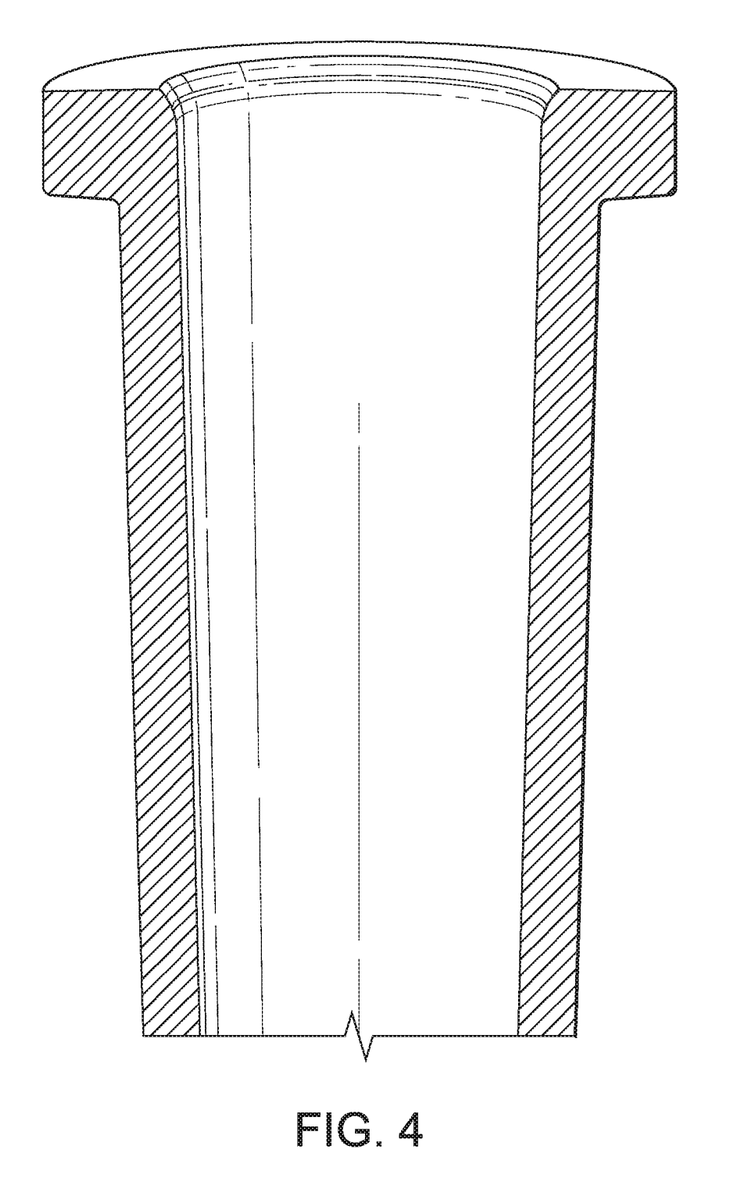
FIG. 4 shows a section through a ceramic candle filter including the hollow-section therein.
Figure 5:
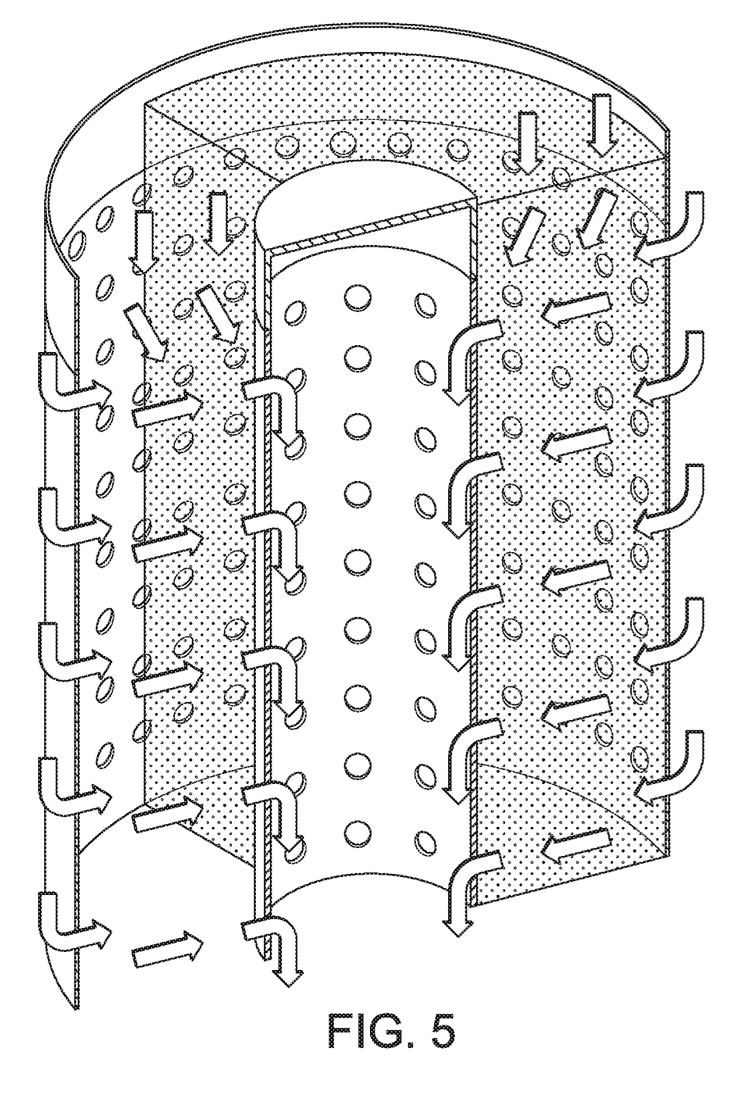
FIG. 5 shows a reactor design of Casale SA suitable to be adapted for use in a cassette-style insert in the hollow section.

In another embodiment, the substrate material e.g. a plurality of beads, microspheres, extrudates, pebbles, tablets, pellets, Raschig rings or a knitted gauze, a cotton gauze, a glass fibre paper or a quartz fibre paper, is held between concentrically disposed wire mesh or gauze cylinders. A suitable such structure is known as a radial flow reactor, see e.g. U.S. Pat. No. 6,620,386. However, in the present invention the direction of flow is opposite to known radial flow reactor designs; in known radial flow reactor designs the gas enters the reactor axially through a central hollow section and then flows laterally and radially through the surrounding catalyst material bed. However, in the present invention, the gas flow is in the opposite direction. That is, where a structure similar to a radial flow reactor is used as the cartridge structure and is inserted within the hollow section of the elongate filter element, gas crossing the porous wall of the elongate filter element into the hollow section of the elongate filter element then passes centripetally through the cylindrical catalyst material bed catalyst to a central hollow section of the cartridge structure before passing out through an open end of the elongate filter element. Alternatively, a reactor design commercialised by Casale SA for ammonia production could be used (see FIG. 5).

In another embodiment, the substrate material is one or more layers of a knitted gauze, a cotton gauze, a wire mesh, an alumina fibre paper, a glass fibre paper or a quartz fibre paper disposed around the central porous hollow section, preferably one or more layers of a pleated, self-supporting knitted gauze, cotton gauze, wire mesh, alumina fibre paper, glass fibre paper or quartz fibre paper.

Elongate Filter Element End-Cap

To prevent axial movement of the cartridge within the hollow-section of the elongate filter element in certain high exhaust gas flow applications or to promote improved catalytic conversion efficiency, the catalysed filter system can include an end cap for the elongate filter element, wherein the end cap defines a hole to permit gas in the hollow section of the elongate filter element to exit the elongate filter element and is shaped to force gas entering into the hollow section of the elongate filter element across the porous walls thereof to contact the substrate material supporting the catalyst component before exiting the hollow section of the elongate filter element via the hole.

The hollow section of the elongate filter element can be circular in cross-section, in which case the end cap is ring-shaped.

Catalyst Component

Preferably, the catalyst component for use in the catalysed filter system is active for catalysing selective catalytic reduction of oxides of nitrogen with a nitrogenous reductant; or for catalysing oxidation of gas components.

The catalyst component active for selective catalytic reduction can comprise a vanadium compound impregnated onto the substrate material. Alternatively, the catalyst component active for selective catalytic reduction can comprise a vanadium oxide supported on particulate $TiO_2$ and preferably additionally comprises tungsten oxide or molybdenum oxide.

Alternatively. the catalyst component active for selective catalytic reduction comprises a transition metal-exchanged zeolite, e.g. CuCHA (copper-promoted aluminosilicate chabazite zeolite).

The catalyst component active for oxidation can comprise at least one of cobalt, manganese, copper, iron, a platinum group metal, silver or gold, supported on a particulate refractory oxide.

In an embodiment of the Cartridge Structure described hereinabove, wherein the substrate material is one or more layers of a knitted gauze, a cotton gauze, a wire mesh, an alumina fibre paper, a glass fibre paper or a quartz fibre paper disposed around the central porous hollow section, an outer layer contacted first by gas entering the hollow section of the elongate filter element across the porous walls thereof comprises catalyst component active for selective catalytic reduction and an inner layer contacted by exhaust gas that has first contacted the catalyst component active for selective catalytic reduction comprises catalyst component active for oxidation.

This concept can also be applied to "radial flow reactor"-type cartridges, wherein an additional, concentrically arranged wire mesh or gauze cylinder is provided, i.e. an outer mesh or gauze cylinder and two inner mesh or gauze cylinders of decreasing radius. A substrate material comprising SCR active catalyst can be disposed between the outer and the middle cylinders; and substrate material comprising oxidation active catalyst can be disposed between the middle and the inner cylinders.

Methods of making substrate material supporting a catalyst component for use in the catalysed filter system according to the invention are as follows. The substrate can be impregnated, e.g. using the wet impregnation technique (see e.g. R. M. Heck et al, $3^{rd}$ Edition at Chapter 2.3, John Wiley & Sons, Inc. (2009)), wherein a bare substrate is immersed in an aqueous solution of precursor of the catalyst component and the resulting impregnated substrate dried and fired in air to generate the finished catalysed substrate material.

Alternatively, the catalyst component can be applied to the underlying substrate material in the form of a washcoat. For example, the catalyst component can be coated using a bath of washcoat where the substrate material is immersed therein and removed, allowed to drain and then dried and fired to fix the washcoat and the catalyst component. Alternatively, the washcoat can be sprayed directly onto the substrate using spray nozzles.

The catalyst component can also be applied on the substrate material by chemical vapour deposition (CVD).

After the substrate material is impregnated or coated with the catalyst, it can be dried if necessary using hot air, microwave radiation, solar irradiation, air convection, or freeze drying, for example. The catalysed substrate material can then be calcined if necessary to high temperature for the catalyst to obtain its final form.

The catalysed substrate material can be formed into the appropriate shape before use within the filter body.

Coating Examples

1. A substrate fibre mat that has the required thickness to achieve the desired catalytic conversion is coated and formed into a tube, as opposed to rolling over on itself, to make the insert.

2. A substrate fibre mat that is thinner than the required thickness to achieve the desired catalytic conversion is coated. The fibre mat is formed into a tube with multiple layers, i.e. rolling over on itself, that together achieve the required thickness to get the desired conversion.

Application Examples

1. A SCR catalyst catalysed fibre mat is rolled and inserted into a candle filter. The insert now gives the candle filter SCR function.

2. A SCR catalyst catalysed fibre mat is rolled into a cylinder shape for insertion in the hollow section of a candle filter. An oxidation catalyst catalysed fibre mat is rolled around the outside of the first SCR catalyst catalysed fibre mat cylinder. A further SCR catalyst catalysed fibre mat is wrapped around the outside of the oxidation catalyst catalysed fibre mat so that the oxidation catalyst catalysed fibre mat is between two SCR catalyst catalysed fibre mats. The flue gas passes through catalyst in the order of SCR→oxidation catalyst→SCR. The benefit of this arrangement is to reduce the slip of ammonia nitrogenous reductant.

3. A SCR catalyst catalysed fibre mat is rolled into a cylinder shape for insertion in the hollow section of a candle filter. A so-called multi-function catalyst comprising a catalyst mat carrying a vanadia-molybdena-titania catalyst supporting palladium is then rolled around the outside of the SCR catalyst catalysed fibre cylinder. The resulting catalyst insert has activity for oxidizing CO and reducing $NO_x$ when a suitable nitrogenous reductant is present in the incoming exhaust gas.

4. A two-layer SCR→Ammonia Slip catalyst (ASC) insert comprising layers of catalysed fibre mat was prepared in a manner similar to Application Example 3, wherein the ASC mat is rolled first and the SCR catalyst mat is rolled around the outside of the ASC mat. The catalyst used to coat the ASC fibre mat comprises a mixture of platinum prefixed onto particulate MFI zeolite and a copper-promoted CHA zeolite. Such a catalyst is disclosed in WO2016/205506A1. This arrangement provides CO oxidation, the reduction of $NO_x$ when a suitable nitrogenous reductant is present in the incoming exhaust gas and the control any subsequent ammonia slip.

5. A three-layer multi-functional catalyst (MFC)→SCR→ASC insert comprising layers of catalysed fibre mat was prepared by first making the insert of Application Example 4, and then rolling a further fibre mat coated with a multi-functional catalyst formulation of palladium (Pd) impregnated onto a $V_2O_5/WO_3/TiO_2$ SCR catalyst around the outside of the MFC mat. This arrangement provides increased CO oxidation relative to Application Example 4, the reduction of NOx when a suitable nitrogenous reductant is present in the incoming exhaust gas and the control any subsequent ammonia slip.

EXAMPLES

In the Examples, reference to a "low-alkali candle filter" is to a candle filter wherein glass fibres, e.g. silicates, in the composition forming the walls of the candle filter have a $Na_2O$ content of <0.05 wt. % and a $K_2O$ content of <0.05 wt. %. The glass fibres in the corresponding "high-alkali candle filter" had a $Na_2O$ content of 2.41 wt. % and a $K_2O$ content of 0.44 wt. %.

Example 1—Procedure for Candle Filter Insert Synthesis

Sufficient commercially available $TiO_2$ powder already containing $WO_3$ was added to water in a mixer while stirring such that the final weight fraction of solids was 30%.

The resulting slurry was ball-milled to reduce the particle size down to a d50 of <6 µm.

After milling, the slurry was returned to the mixer.

Vanadyl oxalate was mixed into the slurry. $NH_3$ is added as necessary to maintain the pH to between 6.5-7.5 to control the rheology of the washcoat.

Silica sol was added to the slurry while mixing. The pH was again maintained at between 6.5-7.5.

The resulting slurry, now referred to as a washcoat was diluted to the appropriate solids content for washcoating. Adjustments to the pH were made as necessary to maintain between 6.5-7.5

The washcoat was poured into a pan of sufficient dimensions to allow a glass fibre mat to be immersed therein.

The glass fibre mat was immersed into the washcoat, removed and then set aside to drip-dry on a drying rack.

The catalysed glass fibre mat was dried at 80° C.

The dried glass fibre mat was rolled into a tube, i.e. having a hollow section therein, of sufficient diameter cross-section that it would fit inside a candle filter, and wire was tied around it to keep its shape. The mat was then calcined in air in an oven at 525° C. to activate the vanadia catalyst.

The SCR catalyst catalysed glass fibre mat was sealed at one end by folding it over on itself to prevent flue gas from bypassing the mat at the closed tip of the candle filter.

The wire tie was removed from the rolled glass fibre mat, and the rolled mat was inserted into the hollow section of a bare, uncatalyzed candle filter.

Example 2—Preparation of Oxidation Catalyst Catalysed Glass Mat

This method is similar to the method employed in example 1. Sufficient γ-$Al_2O_3$ was added to water with mixing to target a solids concentration of 50 wt. % $Al_2O_3$. The alumina-in-water slurry batch was transferred to a ball mill and then milled such that the particle size was below 15 μm (D50 about 4 μm and D90 about 8 μm) while maintaining the pH<6 using acetic acid. The slurry was stored until ready for further use. The stored slurry was diluted with water to 7 wt. % $Al_2O_3$. Tetraammineplatinum nitrate was added to the slurry. The pH was controlled to a pH of 6 using either ammonium nitrate or acetic acid.

A glass fibre mat was immersed into the resulting washcoat and set onto a drying rack to drip dry.

The catalysed glass fibre mat was dried in air in an oven at 80° C. and subsequently fired at 525° C. to activate the catalyst.

Figures 6A, 6B:
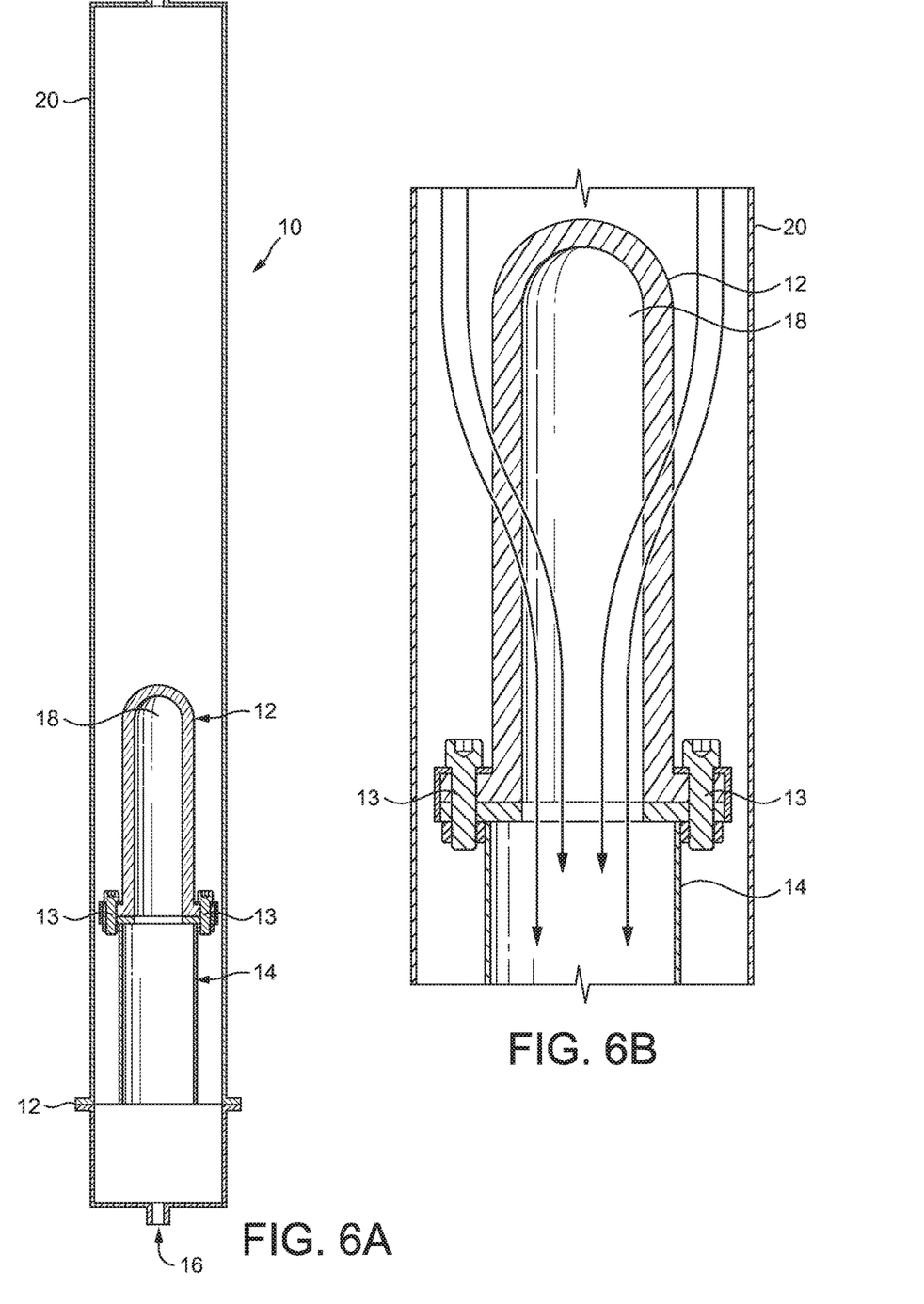
FIG. 6A is a section view through the modified Synthetic Catalytic Activity Test (SCAT) apparatus described in Example 3.
FIG. 6B is a close-up view of FIG. 6B showing the direction of gas flow in the modified SCAT apparatus.

Example 3—Testing of SCR Catalyst Catalysed Glass Fibre Mat Insert in Candle Filter A 9 inch×25 inch section of SCR catalysed glass fibre mat prepared according to Example 1 was rolled into a tube, i.e. including a hollow-section therein, and one end was folded over on itself to prevent gas bypass during testing. The rolled tube was then inserted into an approximately 8 inch-long bare, uncatalyzed low-alkali circular cross-section candle filter with the folded end of the tube inserted first so that the folded end was juxtaposed the closed end of the candle filter. The candle filter including the SCR catalyst catalysed fibre mat insert was tested for SCR activity at temperatures ranging from 250° C. to 450° C. in an adapted synthetic catalytic activity test (SCAT) apparatus 10 shown in FIG. 6A. The candle filter to be tested 12 was sealingly mounted (using an appropriate gasket (not shown) and four equally spaced nut and bolt fixings 13) vertically on a base unit 14 including a gas exit 16 in fluid communication with the circular cross-section hollow section 18 of the candle filter, i.e. the closed tip of the candle filter was disposed uppermost. A tube furnace 20 of approximately 30 inches in length was mounted over the candle filter and was sealingly connected to the base via an appropriate gasket 22 and nut and bolt fixings (not shown). The direction of gas flow in the SCAT apparatus is indicated in FIG. 6B. The test gas concentrations used were as set out in Table 1 below. The flow rate was set such that the linear gas velocity at the outer surface of the filter was 50 Nm/h. Prior to each activity test, the candle filter was equilibrated at each temperature point in a flowing synthetic exhaust gas of appropriate temperature. The results for percentage NO conversion and the associated percentage $NH_3$ conversion (see reaction (1) hereinabove) are shown in Table 2 below.

TABLE 1

| Test Gas Composition | |
|---|---|
| Gas Compound | Concentration (ppmv) |
| $NH_3$ | 500 |
| NO | 500 |
| $NO_2$ | 0 |
| $N_2O$ | 0 |
| $O_2$ | 5% |
| $H_2O$ | 10% |

TABLE 2

| SCR catalyst performance | | | | | |
|---|---|---|---|---|---|
| % | Temperature (° C.) | | | | |
| conversion | 250 | 300 | 350 | 400 | 450 |
| NO | 48.3 | 56.9 | 56.9 | 50.5 | 38.6 |
| $NH_3$ | 51.4 | 63.4 | 70.3 | 75.2 | 80.0 |

The combination of the bare, uncatalyzed candle filter with a SCR catalysed insert shows the insert provides catalytic activity to the overall system. The NOx conversion with respect to temperature is typical of a SCR catalyst without a prefilter, i.e. the filtration of the candle filter upstream from the SCR catalyst.

Example 4—Preparation and Testing of SCR+Oxidation Catalyst "Swiss Roll" Insert A 9 inch×25 inch section of a SCR catalysed glass fibre mat prepared according to Example 1 was laid onto a flat surface. A 9 inch×25 inch section of oxidation catalyst glass fibre mat prepared according to Example 2 was placed on top of the SCR catalyst catalysed glass fibre mat. The two catalysed glass fibre mats were then rolled into a single composite tube, i.e. including a hollow section therein, and one end thereof was folded over on itself to prevent gas bypass during testing. This composite tube of alternating layers of SCR catalyst catalysed glass fibre mat and oxidation catalyst catalysed glass fibre mat was referred to as a "Swiss roll" because of its resemblance to the dessert of that name made from a sponge cake roll filled with whipped cream, jam or icing.

The rolled tube was then inserted into a bare, uncatalyzed low-alkali candle filter with the folded end of the tube inserted first so that the folded end was juxtaposed the closed end of the candle filter. The candle filter with the SCR+oxidation catalyst "Swiss roll" insert was tested for SCR activity at temperatures ranging from 250° C. to 450° C. using the same procedures described in Example 3, including gas mixtures set out in Table 1 hereinabove.

In this arrangement of SCR+oxidation catalyst in a "Swiss roll", the layers of SCR catalyst catalysed glass fibre mat alternate with layers of oxidation catalyst catalysed glass fibre mat, so that a flue gas would encounter the SCR catalyst first and the oxidation catalyst second and then another layer of SCR catalyst and another of oxidation catalyst, i.e. "SCR-OXI-SCR-OXI etc.". The results for percentage NO conversion and the associated percentage $NH_3$ conversion (see reaction (1) hereinabove) are shown in Table 3 below.

TABLE 3

SCR + oxidation catalyst performance

| % conversion | Temperature (° C.) | | | | |
|---|---|---|---|---|---|
| | 250 | 300 | 350 | 400 | 450 |
| NO | 64.2 | 38.9 | 19.0 | 2.1 | −15.0 |
| $NH_3$ | 93.0 | 98.6 | 100 | 100 | 100 |

The results show that the added oxidation catalyst significantly alters the conversion profile compared to the SCR-only system shown in Table 2. The $NH_3$ conversion is higher at every tested temperature, and because of the higher $NH_3$ conversion, the NO conversion is significantly lower at temperatures above 250° C., i.e. the oxidation catalyst is oxidising the $NH_3$ reducing agent, reducing the available quantity of reducing agent available to contribute to NO reduction. It can also be seen that the data point at 450° C. shows negative NO reduction. This indicates that some of the $NH_3$ is being oxidised to NO, thus adding to the inlet quantity of NO of 500 ppmv.

Despite the sub-optimal performance of this first attempt to catalyse the candle filter according to the invention, a number of positives can be drawn from this experiment. Firstly, it can be seen that across the 250-350° C. temperature range, the "Swiss roll" arrangement had superior performance compared with a directly coated catalyst of Comparative Example 6 hereinbelow, even though the directly coated comparison catalyst had a 20 wt. % greater loading of SCR catalyst than the "Swiss roll" catalyst of this Example 4.

Secondly, the manufacture of a prior art directly coated candle filter to include both a SCR catalyst and an oxidation catalyst in a single candle filter would be expected to increase the backpressure in the coated filter significantly relative to a bare filter or the bare filter plus "Swiss roll" insert according to the present invention and would be comparatively complex to process.

The inventors have considered these results and believe that by reducing the activity of the oxidation catalyst, much better performance for the "Swiss roll" embodiment could be expected. However, an alternative arrangement to the "Swiss roll" embodiment of this Example 4 is described in Example 5 hereinbelow.

Example 5—Preparation and Testing of SCR+Oxidation Catalyst Two-Layered Insert

A 9 inch×25 inch section of a SCR catalysed glass fibre mat prepared according to Example 1 was laid onto a flat surface. A 9 inch×25 inch section of oxidation catalyst glass fibre mat prepared according to Example 2 was placed on top of the SCR catalyst catalysed glass fibre mat. The two catalysed glass fibre mats were then rolled into a single composite tube, i.e. including a hollow section therein, and one end thereof was folded over on itself in to prevent gas bypass during testing. In contrast to the "Swiss roll"-type arrangement described in Example 4, the two-layer arrangement of this Example 5 did not feature any further winding of the two sheets. That is, instead of a repeating "SCR-OXI-SCR-OXI etc." of the "Swiss roll" arrangement of Example 4, the composite tube of this Example 5 was configured so that the SCR catalyst outer layer surrounded the tube of oxidation catalyst glass fibre mat in a "SCR-OXI" arrangement without further interleaving of the SCR and oxidation catalyst layers, similar to Application Example 3 hereinabove.

The rolled tube was then inserted into a bare, uncatalyzed low-alkali candle filter with the folded end of the tube inserted first so that the folded end was juxtaposed the closed end of the candle filter. The candle filter with the SCR+ oxidation catalyst two-layered insert was tested for SCR activity at temperatures ranging from 250° C. to 450° C. using the same procedures described in Example 3, including gas mixtures set out in Table 1 hereinabove.

In this arrangement of SCR+oxidation catalyst in a two-layer composite, the synthetic flue gas would encounter the SCR catalyst first and the oxidation catalyst second before the gas exited the hollow section of the candle filter. The results for percentage NO conversion and the associated percentage $NH_3$ conversion (see reaction (1) hereinabove) are shown in Table 4 below.

TABLE 4

SCR + oxidation catalyst performance

| % conversion | Temperature (° C.) | | | | |
|---|---|---|---|---|---|
| | 250 | 300 | 350 | 400 | 450 |
| NO | 51.4 | 63.4 | 70.3 | 75.2 | 80.0 |
| $NH_3$ | 48.3 | 56.9 | 56.8 | 50.5 | 38.6 |

Example 6—High Vs. Low Alkali Filter Substrate

Example 3 was repeated using a bare, uncatalyzed high-alkali candle filter. Additionally, a bare, uncatalyzed low-alkali candle filter as was used in Example 3 was immersed into a washcoat bath of the SCR catalyst composition of Example 1 such that the surface of the candle filter on both the external side and the internal, hollow-section side. This Comparative filter was dried at 80° C. and subsequently calcined at 525° C. to activate the catalyst. The total quantity by mass of SCR catalyst carried by the glass fibre mat according to Example 3 was 20% less than for the comparative, directly washcoated candle filter.

The resulting samples were tested according to the procedures described in Example 3 and the results are shown in Table 5 below.

TABLE 5

SCR catalyst performance of catalysed high-and low-alkali candle filters

| % NO conversion | Temperature (° C.) | | | | |
|---|---|---|---|---|---|
| | 250 | 300 | 350 | 400 | 450 |
| Low-alkali candle filter + SCR insert (Example 3) | 48.3 | 56.9 | 56.9 | 50.5 | 38.6 |
| High-alkali candle filter + SCR insert (Example 6) | 49.7 | 60.6 | 55.0 | 47.8 | 41.1 |
| High-alkali candle filter directly coated with SCR catalyst (Comparative) | 5.2 | 15.4 | 23.1 | Not tested | Not tested |

The combination of the bare, uncatalyzed high-alkali candle filter with a SCR catalysed insert shows that the insert provides nearly identical catalytic activity (at least within a margin of error) compared with the catalysed candle filter based on a low-alkali candle filter according to Example 3. The NOx conversion at identical conditions for a high-alkali candle filter directly coated with SCR catalyst is also shown for comparison. The directly catalysed filter shows very little NO conversion in comparison to the candle filters including catalyst inserts according to the invention.

For the avoidance of any doubt, the entire content of any and all documents cited herein is incorporated by reference into the present application.

The invention claimed is:

1. A catalysed filter system for treating particulate-containing exhaust gas from a stationary emission source, which system comprising an elongate filter element comprising porous walls which define a hollow section and a substrate material supporting a catalyst component disposed within the hollow section, the arrangement being such that gas entering the hollow section of the elongate filter element from across the porous walls thereof must contact the substrate material supporting the catalyst component before exiting the hollow section of the elongate filter element, the catalysed filter system comprising a cartridge structure insertable into the hollow section of the elongate filter element, wherein the cartridge structure retains or holds the substrate material, wherein the cartridge structure comprises a central porous hollow section around which the substrate material is arranged, wherein the substrate material is one or more layers of a knitted gauze, a cotton gauze, a wire mesh, an alumina fibre paper, a glass fibre paper or a quartz fibre paper disposed around the central porous hollow section, wherein the catalyst component is active for catalysing selective catalytic reduction of oxides of nitrogen with a nitrogenous reductant, or for catalysing oxidation of gas components, wherein catalyst component active for selective catalytic reduction comprises a vanadium compound impregnated onto the substrate material, and wherein the catalyst component active for oxidation comprises at least one of cobalt, manganese, copper, iron, a platinum group metal, silver or gold supported on a particulate refractory oxide.

2. The catalysed filter system according to claim 1, wherein the elongate filter element is closed at one end thereof.

3. The catalysed filter system according to claim 1, wherein the elongate filter element is ceramic.

4. The catalysed filter system according to claim 1, wherein the elongate filter is a sintered porous metal filter element.

5. The catalysed filter system according to claim 1, wherein the hollow section is circular in cross-section.

6. The catalysed filter system according to claim 1, wherein the elongate filter element is a bag filter.

7. The catalysed filter system according to claim 1, wherein the elongate filter element has a porosity of from 70 to 90%.

8. The catalysed filter system according to claim 1, wherein a wall thickness of the elongate filter element is from 10 to 40 mm.

9. The catalysed filter system according to claim 1, wherein the elongate filter element is a candle filter.

10. The catalysed filter system according to claim 1, wherein the substrate material comprises a ceramic foam, a bead, a microsphere, an extrudate, a pebble, a tablet, a pellet, a Raschig ring, a honeycomb monolith, a channelled honeycomb body, a knitted gauze, a cotton gauze, a wire mesh, an alumina fibre paper, a glass fibre paper or a quartz fibre paper.

11. The catalysed filter system according to claim 1, wherein the cartridge structure is a self-supporting catalysed ceramic support.

12. The catalysed filter system according to claim 1, comprising an end cap for the elongate filter element, wherein the end cap defines a hole to permit gas in the hollow section of the elongate filter element to exit the elongate filter element and is shaped to force gas entering into the hollow section of the elongate filter element across the porous walls thereof to contact the substrate material supporting the catalyst component before exiting the hollow section of the elongate filter element via the hole.

13. The catalysed filter system according to claim 12, wherein the hollow section of the elongate filter element is circular in cross-section, and the end cap is ring-shaped.

14. The catalysed filter system according to claim 1, wherein the catalyst component is active for catalysing selective catalytic reduction of oxides of nitrogen with a nitrogenous reductant; or for catalysing oxidation of gas components.

15. The catalysed filter system according to claim 11, wherein the catalyst component is active for catalysing selective catalytic reduction of oxides of nitrogen with a nitrogenous reductant; or for catalysing oxidation of gas components.

16. The catalysed filter system according to claim 1, wherein the catalyst component active for selective catalytic reduction comprises a vanadium oxide supported on particulate $TiO_2$.

17. The catalysed filter system according to claim 16, wherein the catalyst component active for selective catalytic reduction additionally comprises tungsten oxide or molybdenum oxide.

18. The catalysed filter system according to claim 1, wherein the catalyst component active for selective catalytic reduction comprises a transition metal-exchanged zeolite.

19. The catalysed filter system according to claim 14, wherein an outer layer contacted first by gas entering the hollow section of the elongate filter element across the porous walls thereof comprises catalyst component active for selective catalytic reduction and an inner layer contacted by exhaust gas that has first contacted the catalyst component active for selective catalytic reduction comprises catalyst component active for oxidation.

20. The catalysed filter system according to claim 1, wherein an outer layer contacted first by gas entering the hollow section of the elongate filter element across the porous walls thereof comprises catalyst component active for selective catalytic reduction and an inner layer contacted by exhaust gas that has first contacted the catalyst component active for selective catalytic reduction comprises catalyst component active for oxidation.

21. The catalysed filter system according to claim 15, wherein an outer layer contacted first by gas entering the hollow section of the elongate filter element across the porous walls thereof comprises catalyst component active for selective catalytic reduction and an inner layer contacted by exhaust gas that has first contacted the catalyst component active for selective catalytic reduction comprises catalyst component active for oxidation.

22. An exhaust system for a plant for performing an industrial process, which system comprising an injector for a nitrogenous reductant or a precursor thereof, a source of nitrogenous reductant or a precursor thereof and a catalysed filter system according to claim 1, wherein the catalyst component is active for catalysing selective catalytic reduction of oxides of nitrogen with a nitrogenous reductant.

23. A method of treating a hot particulate-containing exhaust gas containing oxides of nitrogen from a stationary emission source, which method comprising injecting a nitrogenous reductant into the exhaust gas, filtering particulate from the exhaust gas containing the nitrogenous reductant by passing the exhaust gas through porous walls of the catalysed filter system according to claim 1 and into the hollow section thereof; contacting substrate material supporting catalyst component active for catalysing selective catalytic reduction of oxides of nitrogen within the hollow section with particulate-filtered exhaust gas containing the nitrogenous reductant; and allowing exhaust gas which has contacted selective catalytic reduction catalyst to exit the elongate filter element.

\* \* \* \* \*